3,179,639
CURING SYSTEM FOR NITRILE POLYMERS
William M. Hutchinson, Bartlesville, Okla., assignor to Phillips Petroleum Company, a corporation of Delaware
No Drawing. Filed June 12, 1961, Ser. No. 116,302
7 Claims. (Cl. 260—83.3)

This invention relates to a curing system for nitrile polymers.

Although polymers containing nitrile groups have been known for some time and rather extensively used as rubbery materials, after compounding and curing, all of the curing agents used heretofore for these copolymers have acted conventionally by crosslinking the polymer molecules through the double bonds in the carbon chains, or have first hydrolyzed the nitrile group to a carboxyl group and cross-linked therethrough.

The following are objects of my invention.

An object of my invention is to provide cured polymers containing a nitrile group. A further object of my invention is to provide cured butadiene acrylonitrile copolymers. A further object of my invention is to provide a new process for curing polymers containing the nitrile group.

Broadly, my invention comprises a process comprising mixing a polymer having a viscosity of at least 700 poises and containing 8 to 30 weight percent of the nitrile radical with lithium cyanoborohydride and heating the mixture to cure the same. Thus, it is apparent that the invention is applicable to rubbery polymers and to those which are viscous liquids.

Many polymers are available which can be cured by this process. A broad group comprises copolymers of conjugated dienes of 4 to 12 carbon atoms and acrylonitrile, methacrylonitrile, or ethacrylonitrile. Specific examples of the dienes include 1,3-butadiene, isoprene, 2,3-dimethyl-1,3-butadiene, 2-methyl-1,3-pentadiene, 2-phenyl-1,3-butadiene, 1,3-decadiene, and 1,3-dodecadiene. The curing system can also be used for homopolymers of acrylonitrile and its derivatives. Another group of polymers comprises cyano-substituted conjugated dienes such as 2-cyanobutadiene, 3-cyanoisoprene, 2-cyanohexadiene and 2-cyano-1,3-octadiene. The above polymers are substituted hydrocarbon polymers which contain only carbon, hydrogen, and nitrile radicals.

The polymers cured by the process of my invention can be liquid polymers having a viscosity as low as 700 poises at 25° C. up through polymers having a Mooney viscosity (ML-4 at 100° C.) of 200.

The curing agent of my invention is lithium cyanoborohydride. This is commonly associated with one to four atoms of ether oxygen, preferably as the dioxanate. For example each mol of lithium cyanoborohydride will be associated with ½ to 2 mols of dioxane. The lower range of ether concentration is preferred. The pure material free of any ether (or dioxane) can be used.

The lithium cyanoborohydride is prepared by heating to approximately 100° C. a solution of lithium borohydride and excess hydrogen cyanide in an ether. A pressure of approximately 500 p.s.i. is required to maintain the system in the liquid phase.

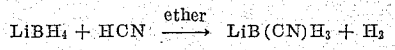

The lithium cyanoborohydride used in this work was obtained from the Aldrich Chemical Co. The material is described in the following references:

Gaylord, "Reduction with Complex Hydrides," Interscience, 1956, p. 37. Wittig, G. and Raff, P.—Annalen 573 pages 195–209 (1951).

The copolymer of butadiene and acrylonitrile may be prepared by the emulsion polymerization method described by Walls in JACS, 70, 1031-7 (1948).

By the method of this invention, it is possible to prepare polymers with a wide range of properties from liquids to rubbery solids. The liquid polymers (before curing) are of particular interest where castable compositions are desired. In general, the liquid polymers cure to soft rubbery products which are suitable as solid rocket propellant binders, caulking agents, etc. When the starting copolymer is rubbery, the cured composition will be much tougher and better suited to wear-resistant articles of high tensile strength. Ranges in properties of interest for these two classes of copolymer are as follows:

The liquid polymer should have a viscosity in the range of 700 poises at 25° C. to 1 ML-4 at 100° C. The rubbery polymer will have a viscosity in the range of 1 ML-4 to 200 ML-4 at 100° C.

In general, the polymer, whether liquid or rubbery solid, is thoroughly mixed with the curative at room temperature, in the first case by simple stirring, and in the second, by means of a roll mill, sigma blade mixer or similar equipment.

The mixture is then molded and adjusted to the curing temperature, generally in the range of 50° C. to 250° C. and preferably 70° C. to 200° C., and maintained at this temperature for from 10 days to 5 minutes respectively; and preferably from 3 days to 15 minutes, respectively.

The amount of curing agent employed varies with the nature of the polymer being cured and the kind of properties desired in the final product. The amount of curative ranges from 0.2 to 0.6 mol of curative per mol of nitrile radical and, preferably stoichiometric or 0.5.

*Example I*

A very viscous liquid copolymer of butadiene and acrylonitrile was prepared employing the following recipe.

| | Parts by weight |
|---|---|
| Butadiene | 88 |
| Acrylonitrile | 12 |
| Water | 200 |
| Potassium fatty acid soap | 6.0 |
| Tert-dodecyl mercaptan | 4.4 |
| $K_4P_2O_7$ | 0.198 |
| $FeSO_4 \cdot 7H_2O$ | 0.167 |
| KCl | 0.50 |
| p-Methane hydroperoxide | 0.113 |
| Temperature, ° C. (41° F.) | 5 |
| Shortstop: di-t-butyl hydroquinone | 0.20 |
| Antioxidant: phenyl-β-naphthylamine (parts per 100 parts polymer) | 2.0 |

This polymer was taken to a conversion of 71 percent in 8.5 hours. Brookfield viscosity was well over 4000 poises, and analysis gave a nitrogen content of 4.7 weight percent, which corresponds to an acrylonitrile content of 17.8 percent and a —C≡N content of 8.9 weight percent.

One hundred parts by weight of this polymer was thoroughly mixed with 7.0 parts of lithium cyanoborohydride associated with ½ mole of dioxane. No stiffening occurred on mixing other than normal in filling a polymer with inert filler to this extent. Heating the mixture 3 hours at 60° C. in vacuum caused bubbling to a degree commensurate with removal of dioxane from the curative, but did not cure the polymer. Overnight under same conditions caused a slight cure; and after one week (same conditions) the product was more tightly cured (to a soft, snappy rubber) and did not dissolve in benzene.

*Example II*

A liquid copolymer of butadiene and acrylonitrile was prepared employing the following recipe.

| | Parts by weight |
|---|---|
| Butadiene | 85 |
| Acrylonitrile | 15 |
| Water | 180 |
| Sodium fatty acid soap | 5.0 |
| Mercaptan [1] | 5.60 |
| $K_2S_2O_3$ | 0.30 |
| Temperature, °C. (122° F.) | 50 |
| Shortstop: DTBHQ [2] | 0.21 |
| Antioxidant: AO 2246 [3] (based on 100 parts polymer) | 2.0 |

[1] A blend of tertiary $C_{12}$, $C_{14}$, $C_{16}$ mercaptans in a weight ratio of 3:1:1.
[2] Ditertiary butylhydroquinone.
[3] 2,2'-methylene-bis(4-methyl-6-t-butylphenol).

Charge order was soap solution, butadiene, acrylonitrile, mercaptan and persulfate. The persulfate was charged to the series immediately after the mercaptan. The temperature was gradually raised to 45–50° C. over a period of five minutes and then maintained at 50° C. (122° F.).

The polymers were salt-alcohol coagulated. The isopropanol added was 7 less than 80 percent of the total water in the latex after dilution with water and salt solution so that the alcohol-soluble antioxidant would be retained in the polymer, which was added in a 70/100 water-isopropanol mixture prior to creaming and coagulation.

The polymers were washed three times with deionized water at room temperature and once or twice at 50–60° C. The washed polymers were dried to constant weight at 50–60° C. in the vacuum oven for as long as 24 hours.

A blend of eight batches, all polymerized to a conversion of 66 percent in 3.3 hours, had a viscosity of 750 poises at 25° C., a nitrogen content of 4.3 percent equivalent to 16.3 percent acrylonitrile, and a sulfur content of 0.92 percent.

The liquid copolymer blend described above was mixed with lithium cyanoborohydride associated ½ mol of dioxane. It was then cured in an oven at 110° F. for one week. The elasticity of the cured product was qualitatively observed before and after treating a 0.1 gram sample of polymer with 20 cc. of benzene at room temperature.

A first run was made using a ratio of one gram of polymer to 0.09 gram of curative corresponding to trifunctional curing, a second run with a ratio of one gram of polymer to 0.14 gram of curative corresponding to difunctional cure, and a third run in the ratio of one gram of polymer to 0.28 gram of curative corresponding to monofunctional cure. Run 1 produced a soft gel insoluble in benzene at room temperature, but slightly swollen thereby. Run 2 was more tightly cured to a stiff gel, insoluble in benzene and only very little swollen thereby. Run 3 produced an extremely soft gel only. It can therefore be concluded that the curative in this system reacts in a difunctional manner and that it should be used in the range of 0.2 to 0.6 mol per mol of nitrile radical.

*Example III*

"Paracril B," a butadiene-acrylonitrile copolymer containing 26 percent combined acrylonitrile, and Pentalene 195 (an alkylated naphthalene softener sold by Sharples Chem. Co.) were milled together for 20 minutes in a Baker Perkins dispersion blade mixer. Lithium cyanoborohydride was then added and the mixing was continued for another 5 minutes. Two runs were made, as follows:

| | Parts by Weight | |
|---|---|---|
| | A | B |
| Paracril B | 100 | 100 |
| Pentalene 195 | 20 | 20 |
| Lithium Cyanoborohydride | 0 | 7 |

The compositions above were cured in a vacuum oven at 110° C. for 22 hours.

Penetration values were determined on a Precision Penetrometer with a Serial D-490 Van Keuren Co. needle under a loading of 200 grams for 5.0 seconds at room temperature.

The percent swell is defined as 100 times the weight difference of the benzene swelled material and the dried material divided by the weight of the dried material.

| Parts of Curative per 100 parts of rubber | Penetration, mm. | Swell, Percent |
|---|---|---|
| 0 | 6.0 | 1,730 |
| 7 | 4.5 | 1,070 |

The results above indicate that (1) the Paracril B used was already partly cross-linked; (2) definite cure was promoted by the lithium cyanoborohydride.

The cured product of this invention exhibits suitable rubbery properties, such as good tensile strength, high snap, and adhesion. When the liquid polyers are cured with conventional curing agents such as accelerator-sulfur or peroxides, etc., the cured product was crumbly and resembled "art gum." Lithium aluminum hydride and sodium-borohydride produced no cure.

The cured polymers of this invention are compatible with crystalline oxidizers and other ingredients of solid rocket propellants such as reactive metal hydrides and therefore are suitable as fuel binders. Starting with a liquid copolymer, castable propellants can be produced. The liquid polymers are likewise suitable for producing caulking compounds, potting compounds, and other sealants. The solid rubbery polymers cured with lithium cyanoborohydride have good high tensile and high elastic properties for articles such as rubber gloves, gaskets, materials of construction, etc. All of the materials made according to this invention are stable and highly resistant to oxidation and to the action of solvents, especially hydrocarbons.

As many possible embodiments can be made of this invention without departing from the scope thereof, it is to be understood that all matter herein set forth is to be interpreted as illustrative and not as unduly limiting the invention.

I claim:

1. A process comprising mixing a substituted hydrocarbon polymer containing only carbon, hydrogen, and nitrile radicals having a viscosity of at least 700 poises with lithium cyanoborohydride and heating the mixture to cure the same, the amount of lithium cyanoborohydride being 0.2 to 0.6 mol per nitrile radical present in the polymer.

2. A process comprising mixing a substituted hydrocarbon polymer containing only carbon, hydrogen, and nitrile radicals having a viscosity of at least 700 poises and containing 8 to 30 weight percent of the nitrile radical with lithium cyanoborohydride and heating the mixture to cure the same, the amount of lithium cyanoborohydride being 0.2 to 0.6 mol per nitrile radical present in the polymer.

3. The process of claim 2 wherein said heating is at a temperature of 50° C. to 250° C. for 10 days to 5 minutes, longer times being used at lower temperatures.

4. A process comprising mixing a polymer of a conjugated diene of 4 to 12 carbon atoms and a compound selected from the group consisting of acrylonitrile, methacrylonitrile, and ethacrylonitrile, said polymer having a viscosity of at least 700 poises and 8 to 30 weight percent of the nitrile radical, with lithium cyanoborohydride, in an amount of 0.2 to 0.6 mol per nitrile radical in the polymer, and heating the mixture to cure the same.

5. A process comprising mixing a butadiene/acrylonitrile polymer having a viscosity of at least 700 and 8 to 30 weight percent nitrile radical with, per nitrile radical, 0.2 to 0.6 mol of lithium cyanoborohydride, and heating the mixture to cure the same.

6. The process of claim 5 wherein said polymer is a liquid polymer.

7. The process of claim 5 wherein said polymer is a rubbery polymer.

No references cited.

LEON J. BERCOVITZ, *Primary Examiner.*

M. LIEBMAN, *Examiner.*